UNITED STATES PATENT OFFICE.

ASMUS MATTHIAS HEINRICH HANSEN AND MARTIN CHRISTIAN JOHANNES NEVE, OF HAMBURG, GERMANY.

WATER-TIGHT CEMENT AND PROCESS OF PRODUCING THE SAME.

1,205,735.      Specification of Letters Patent.      Patented Nov. 21, 1916.

No Drawing.      Application filed January 23, 1913.    Serial No. 743,761.

*To all whom it may concern:*

Be it known that we, ASMUS MATTHIAS HEINRICH HANSEN and MARTIN CHRISTIAN JOHANNES NEVE, subjects of the King of Prussia, residing at 3 Ober-Bergfelde and 1 Treskowstrasse, Hamburg, Germany, have invented a new and useful Improved Water-Tight Cement and Process of Producing the Same; and we do hereby declare the following to be a full, clear, and exact description of the invention.

Our invention relates to an improved process of producing a water-tight cement.

Numerous proposals have been made with a view to making a cement which is water-tight and will be free from exudations. Many of such proposals are referred to in patent literature. In most cases the intention has been to impregnate the burnt mass of cement, before being ground up and either while yet warm or when already cold, with some suitable liquid and so to obtain, after drying and grinding, a cement powder which will be suitable not only for making an artificial stone unaffected by and impermeable to water, but chiefly for dressing, building and concreting without the necessity of employing coatings of asphalt or adopting other means to obtain imperviousness. For example, it is claimed that the above purpose has been successfully accomplished in practice by the treatment of Portland cement with soda, potash, paraffin, ozocerite, mixtures of potassium stearate and colophony, bitumen or the like. For use in making plaster, mortar and many mixtures for artificial stones there have been proposed oils, fats, varieties of wax, soaps, gum and so on. Experience has however proved that the benefits claimed in such mixtures are in most cases not obtained or, if they are, only at the expense of other valuable qualities, *e. g.* binding qualities.

A primary object of our invention is to produce a hydraulic cement which is really water-tight, and which can be effectively produced in a simple manner without in any way prejudicing the excellence of the other qualities of the cement. To this end, we prepare in the following manner a mixture, which, according to our experiments, is preferably proportioned as stated:—40 parts of fish-oil and 10 parts of hydrochloric acid are boiled together. In addition 200 parts of burnt lime are slaked in 300 parts of water. While this lime is being slaked, the above warm mixture of fish-oil and hydrochloric acid is added to it.

The unevaporated water employed in slaking the lime thereupon entirely separates from the mixture, in such manner that a paste remains behind, which can be left to dry for a short time and which thus becomes as hard as clinker. Of this mixture 3 to 4% is added to the cement clinker (especially of the kind of so called Portland cement) to be ground, and the entire mixture is then ground up finely. The sifted product furnishes a hydraulic cement which is completely water-tight.

Changes in the proportions of the constituents employed in the mixture, and in the manner in which the process is carried out may be made; such changes can be made to suit the quality of the cement employed and to suit the desired requirements of the product. Instead of fish-oil other fats or oils may be employed, and any other acid can be used in connection with it.

We claim:—

1. A process of producing a water-tight cement, consisting in first preparing a mixture of an animal oil, hydrochloric acid and lime, in then adding this mixture to cement, in mixing the whole together and in finely grinding the whole.

2. The herein described process of producing a water-proof cement which consists in first preparing a mixture of a fat, hydrochloric acid and lime, and subsequently adding this mixture to cement, mixing the whole together and finely grinding the whole.

3. A process of producing a water-tight cement, consisting in boiling an animal oil with hydrochloric acid, in adding the warm mixture so obtained to lime while being slaked, in allowing the paste so formed to dry, in adding the dried paste to cement clinker, and in finely grinding the whole.

4. A process of producing a water-tight cement, consisting in boiling forty parts of fish-oil with ten parts of hydrochloric acid, in adding the warm mixture so obtained to two hundred parts burnt lime while being slaked in three hundred parts water, in allowing the paste so formed to dry, in adding the dried paste to cement clinker, and in finely grinding the whole.

5. In the process of producing a water-tight cement, the step consisting in boiling an animal oil with hydrochloric acid, in adding the mixture so obtained to lime and in allowing the paste so formed to dry.

6. The herein described waterproof cement which consists of a ground mixture of cement clinker and the product resulting from mixing fat, hydrochloric acid, and lime.

7. A process of producing a water-tight cement, consisting in first preparing a mixture of fat, acid and lime, then adding this mixture to cement, then mixing the whole together, and then finally grinding the whole.

8. A process of producing a water-tight cement, consisting in first preparing a mixture of a fat, inorganic acid and lime, then adding this mixture to cement, then mixing the whole together, and then finally grinding the whole.

In testimony that we claim the foregoing as our invention, we have signed our names in presence of two subscribing witnesses.

ASMUS MATTHIAS HEINRICH HANSEN.
MARTIN CHRISTIAN JOHANNES NEVE.

Witnesses:
ERNEST H. L. MUMMENHOFF,
KARL GEHWAUDKY.

Copies of this patent may be obtained for five cents each, by addressing the "Commissioner of Patents, Washington, D. C."